May 15, 1962 R. A. FINDLAY 3,035,040
REACTION PROCESS FOR POLYMERIZATION
Filed Feb. 24, 1960
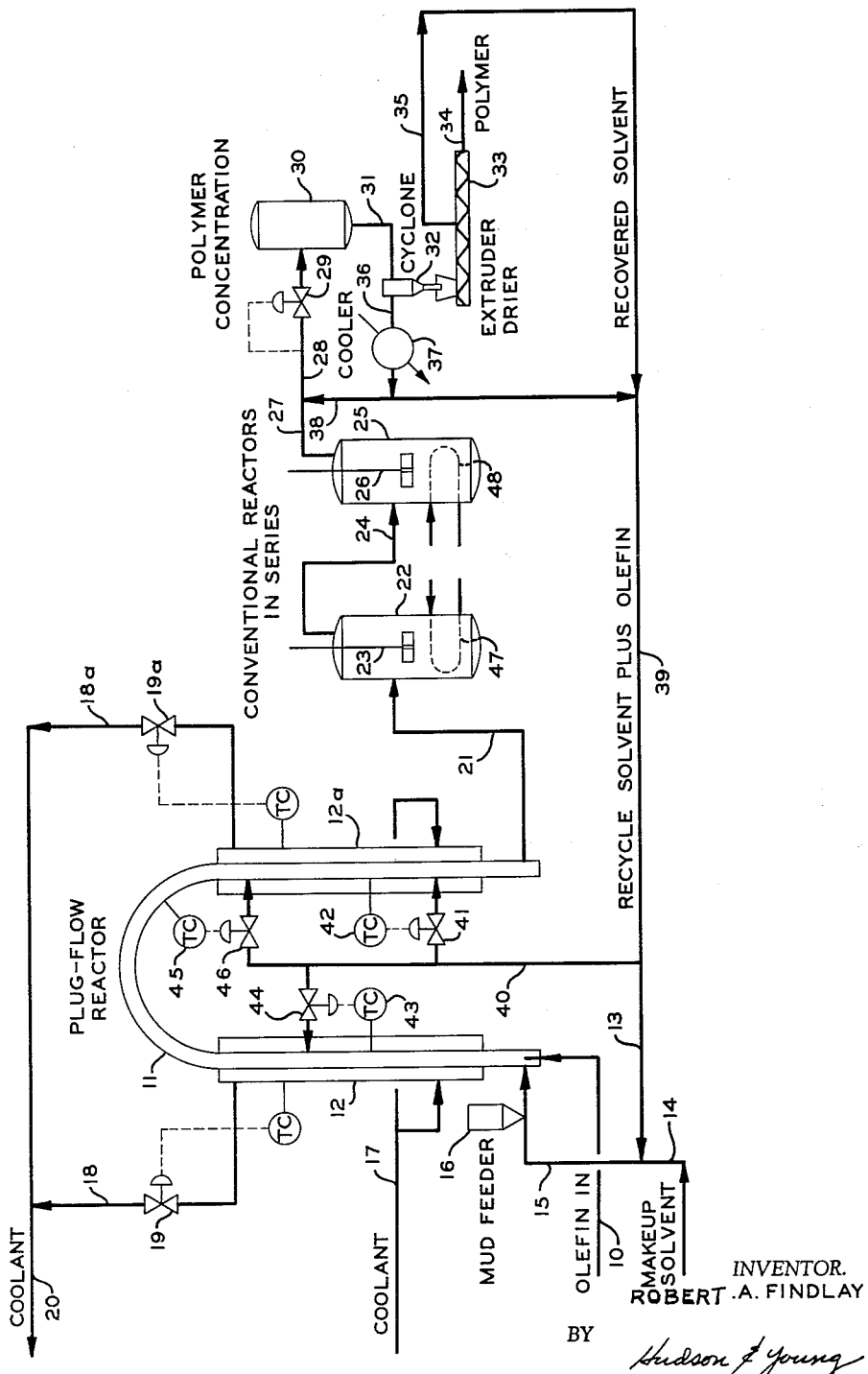
INVENTOR.
ROBERT A. FINDLAY
BY
*Hudson & Young*
ATTORNEYS United States Patent Office 3,035,040
Patented May 15, 1962

3,035,040
REACTION PROCESS FOR POLYMERIZATION
Robert A. Findlay, Bartlesville, Okla., assignor to Phillips Petroleum Company, a corporation of Delaware
Filed Feb. 24, 1960, Ser. No. 10,619
10 Claims. (Cl. 260—94.9)

This invention relates broadly to an improved process and arrangement of reaction zones for the polymerization of polymerizable hydrocarbons. In accordance with one aspect, this invention relates to an improved catalytic polymerization process wherein higher catalyst productivity is obtained. In accordance with another aspect, this invention relates to an improved reactor system for the polymerization of polymerizable hydrocarbons, especially 1-olefins.

Various processes and reaction systems have either been proposed or used for polymerization and other reactions in the prior art. However, many of these processes or systems are limited in their applicability for one reason or another. For example, many prior art systems that are adaptable for one process often cannot be satisfactorily employed in another. Other known systems are not satisfactory for exothermic reactions, for example, polymerization and particularly in polymerization processes where high molecular weight normally solid materials are produced since these systems are not ordinarily suitably adapted to remove the heat of reaction or make the most efficient use of the catalyst employed. The present invention relates to an improved reactor system or arrangement particularly adapted to polymerize 1-olefins, for example to normally solid polymers, whereby increased catalyst productivity, improved heat exchange, and other advantages are obtainable.

Accordingly, an object of this invention is to provide a novel arrangement of reaction zones for polymerization.

Another object of this invention is to provide an improved process wherein provision is made for maintaining close control over reaction temperature.

Another object of this invention is to provide a multistage process for polymerization wherein close control of polymerization temperature is maintained.

A further object of this invention is to provide a multistage polymerization process wherein increased catalyst productivity is obtainable.

Other aspects, objects, as well as the several advantages will become apparent upon a study of the disclosure, drawing and the appended claims.

In accordance with the present invention, I provide an improved process for the polymerization of polymerizable hydrocarbons, for example, olefins polymerizable to normally solid polymers, in the presence of a catalyst which comprises first polymerizing at least a portion of the polymerizable material in dilute phase in a streamline flow reaction zone, and then subjecting the partially polymerized admixture to further polymerization in an agitated zone to substantially complete the polymerization reaction.

More specifically, I provide an improved multistage process for the polymerization of 1-olefins to normally solid polymers in the presence of a catalyst which comprises continuously introducing olefin, diluent and catalyst into a small diameter highly elongated tubular reaction zone, a substantial portion of said reaction zone being surrounded by a fluid heat exchange medium to remove heat of reaction, passing the reaction mixture under streamline flow conditions through said elongated zone maintained at polymerization conditions of temperature and pressure to polymerize at least a portion of said olefin, passing the effluent from said elongated zone to an agitated tank-type reaction zone, preferably a series of stirred reactors maintained at polymerization conditions of temperature and pressure to polymerize unreacted olefin in said effluent, recovering polymer product from the agitated zone effluent, and recycling unreacted olefin and diluent to said tubular zone. Multipoint addition of recycled diluent provides for additional temperature control in the elongated reaction zone and is preferred.

Although the invention is not limited to liquid-phase reaction, an advantageous application thereof is to liquid-phase operation, which is a frequently preferred mode of conducting the polymerization. When polymerization is conducted in the liquid phase, it is often preferred to utilize the catalyst in the form of a slurry or suspension in an inert solvent or diluent. The invention is not limited to a particular catalyst or diluent and any catalyst known for the polymerization of olefins to normally solid polymers can be advantageously employed in my process. Also, it should be understood that my invention is not limited to any particular diluent or solvent for use in the process and the choice of diluent will depend primarily upon the particular catalyst employed or the type of polymer to be produced.

A particularly advantageous polymerization catalyst and diluent heat can be employed in the process of my invention are described in U.S. Patent 2,825,721 of Hogan et al. According to said patent, a chromium oxide catalyst, preferably containing hexavalent chromium, associated with at least one oxide selected from the group consisting of silica, alumina, zirconia and thoria and composites thereof is employed to prepare normally solid polymers of 1-olefins. Diluents or solvents that can be used in that process are hydrocarbon solvents which are inert and liquid under the polymerization conditions such as paraffins and naphthenes saving from 5 to 12 carbon atoms per molecule. Commonly known polymerization catalysts such as the Ziegler-type and the high-pressure type polymerization catalysts as well as other diluents or solvents can also be used, if desired, in my process.

The first step of the present invention comprises introducing olefin, catalyst and diluent into the inlet end of a small diameter highly elongated tubular reaction zone, which is preferably surrounded by one or more heat exchange jackets for removal of heat of reaction. Generally, the first reaction zone will comprise a plurality of jacketed pipe loops positioned either horizontally or vertically. However, if desired a relatively long straight tubular reaction zone can be employed. Multipoint addition of cooled recycled diluent aids heat removal and is preferred. Also, the pipe loops can be individually jacketed so that they can be maintained at different temperatures as required to remove heat of reaction.

Olefin, catalyst, which is preferably suspended in diluent if in particulate form, and diluent are introduced into the inlet end of the tubular reactor and passed therethrough under streamline or plug-like flow conditions. The reaction at the inlet end of the tubular reactor takes place in a very dilute polymer solution which has a correspondingly low viscosity, and therefore heat removal is relatively easy in a simple jacket. Also, the presence of dilute solution in the tubular reactor means that lower jacket temperatures can be tolerated since there is less danger of fouling the reactor walls with precipitated polymer. As a given volume of reaction mixture passes through the tubular reactor maintained under polymerization conditions of temperature and pressure, the mixture becomes more viscous due to continued polymerization of the olefin to polymer and, therefore, removal of heat of reaction becomes increasingly difficult since correspondingly lower heat transfer coefficients prevail. For any given flow rate and tube size there exists a limiting polymer concentration above which the available heat transfer surface of the tube wall could no longer be sufficient to dissipate the heat of reaction.

In accordance with the present invention, the partially polymerized reaction mixture in the tubular reactor is passed directly to an agitated reaction zone, preferably a series of stirred reactors, also maintained under polymerization conditions to react additional quantities of unreacted olefin present in the tubular reactor effluent. The polymerization reaction can be carried to completion in the agitated reaction zone, if desired. The polymer concentration of the tubular reaction zone effluent will generally be below about 10 weight percent. The more viscous solution can be better handled and further polymerized in the agitated tank reactor. Reaction conditions in the agitated zone can be substantially the same as in the tubular reactor, as desired.

The operation of the tubular reactor of this invention in streamline flow prevents the "by-passing" of catalyst that occurs in stirred reactor and in tubular reactors operated under conditions of turbulent flow. In the latter cases, substantial amounts of unused catalyst are removed with the reactor effluent. An important overall result of employing the reaction system of this invention is that much more efficient use of the catalyst is obtained and in many instances catalyst productivity is so high that it is unnecessary to remove catalyst from the final polymer product.

Better understanding of the invention will be obtained upon reference to the accompanying diagrammatic flow sheet which illustrates a preferred embodiment of the invention as applied to the polymerization of ethylene.

Referring now to the drawing, a liquid hydrocarbon solvent, such as normal hexane or cyclohexane, is passed to reactor 11 by way of conduit 15. Solvent in conduit 15 is made up of recycled solvent introduced by conduit 13 and make-up solvent, as required, by way of conduit 14. Finely divided catalyst, for example, 20 to 150 microns, is added to the solvent in conduit 15 from feeder 16 to form a slurry or suspension of the catalyst in the solvent for introduction into reactor 11. The catalyst can comprise, for example, 2 weight percent chromium in the form of chromium oxide supported on a co-precipitated gel composite comprising 90 weight percent silica and 10 weight percent alumina. When using such a catalyst, the make-up solvent introduced into the system is preferably pretreated to remove impurities such as dissolved water, oxygen and sulfur compounds. The catalyst slurry is introduced into the inlet end of elongated reactor 11 and therein contacted with an olefin, for example, ethylene, introduced by way of conduit 10.

Reactor 11 is an elongated tubular reactor and, as shown, is in convolute form, but it is not outside the scope of the invention to have a relatively long straight tube. Reactor 11 has a small diameter relative to the reactor length. Tubes of various diameters may be used and the proper selection of flow velocity to maintain the reactants in streamline flow is well understood in the art. Elongated reactor 11 is shown in the drawing as being positioned vertically and comprises a single vertical pipe loop. However, if desired, a plurality of such pipe loops can be employed positioned either horizontally or vertically. Vertical positioning of the tube assists polymer flow and is preferred.

Elongated reaction tube 11 is shown enclosed with individual heat exchange jackets 12 and 12a. Coolant is introduced into jackets 12 and 12a by way of conduit 17. Warm coolant is removed from the jackets by way of conduits 18 and 18a, respectively, and then passed through conduit 20. Control valves 19 and 19a regulate the flow of coolant withdrawn from the jackets responsive to the temperature in each of the jackets. If desired, the individual jackets can be maintained at different temperatures as required. For example, when the reactor feed streams enter the reactor below the desired reactor temperature, the heat exchange fluid passed through the first jacket may be warmer than said feed streams, while the heat exchange fluid passed through the subsequent jackets is cooler than the reaction mixture within the corresponding zones of the reaction tube so that exothermic heat of reaction can be removed.

As the reaction mixture passes through elongated reactor 11, olefin is polymerized to normally solid polymer. A rapid reaction takes place at the inlet end of tubular reactor 11 in the dilute solution. As the solution progresses through the reactor it increases in viscosity due to continued polymerization of olefin. As the viscosity of the reaction mixture increases it becomes increasingly difficult to remove the heat of reaction and, as shown in the drawing, cooled recycled solvent is advantageously injected at a plurality of points along reaction tube 11 to assist in the removal of the heat of reaction. The amount of recycle solvent injected into the reactor is controlled by control valves 41, 44 and 46 responsive to the temperature in the polymerization zone upstream of the injection point as measured by temperature controllers 42, 43 and 45, respectively.

The total effluent removed from tubular reactor 11 is passed directly to stirred reactor 22 by way of conduit 21. Stirred reactor 22 is equipped with an agitator 23 and heat exchange coil 47. Within stirred reactor 22 additional unreacted olefin present in tubular reactor 11 effluent is polymerized. The resultant formation of increased quantities of polymer results in an increase in the concentration of polymer in the reaction mixture in reactor 22, and consequently in an increase in the viscosity of said mixture so that as reaction proceeds the mixture becomes increasingly difficult to handle and cool and, therefore, is maintained under agitated conditions. The reaction mixture is removed from reactor 22 by way of conduit 24 and introduced into stirred reactor 25 wherein additional unreacted olefin is polymerized. Any number of stirred reactors desired in series can be employed in the present invention to complete the polymerization. Stirred reactor 25 is equipped with an agitator 26 and heat exchange coil 48.

The total reaction mixture of effluent from the system is removed from stirred reactor 25 by way of conduit 27 and contacted with cooled recycled solvent introduced by conduit 38 to precipitate polymer in the solution. The solution containing precipitated polymer is introduced into holding tank 30 by way of conduit 28 having control valve 29. Polymer slurry is removed from tank 30 by way of conduit 31 and passed to a liquid-solid separation zone 32. As shown in the drawing, separation zone 32 is a cyclone separator. A high solids content slurry is removed from separator 32 and introduced into extruder-dryer 33 wherein polymer is recovered as a product of the process through conduit 34. Solvent is removed from extruder-dryer 33 by way of conduit 35 and recycled to reactor 11. Solvent and unreacted olefin removed from separator 32 by way of conduit 36 is passed through cooler 37 wherein the mixture is cooled to a temperature below about 150° F. The effluent from cooler 37 is divided into two portions, one portion being sent through conduit 38 to precipitate polymer in the reaction effluent in conduit 27, and the remainder recycled in conduit 39 to reactor 11. The recycle solvent plus olefin present in conduit 39 is also divided, a portion being passed through conduits 13 and 15 to be mixed with catalyst, as previously described, and the remainder is injected at a plurality of points by conduit 40 into reactor 11 to assist control of reaction temperature.

Reactor 11 can be of any desired length sufficient to provide a reaction or residence time therein of from several minutes to several hours. The design and proportions of the pipe loops are generally well understood by those skilled in the art. Also, any number of stirred reactors can be provided to maintain a reaction or residence time therein sufficient to complete or substantially complete the polymerization. Also, it should be understood that other arrangements of polymer recovery can be employed comprising fractional distillation, filtration, evaporation, flashing and/or cooling equipment as is well known in the art.

*Specific Example*

In a system of the type shown in the drawing 4500 pounds of cyclohexane, 650 pounds of ethylene, 0.6 pound of catalyst are fed to the inlet end of elongated reactor 11 per day. The catalyst is in finely divided form having a mean diameter of 60 microns, and is a supported chromium oxide-containing catalyst, such as is disclosed in Hogan et al., supra. The ethylene and cyclohexane streams are preferably purified to remove catalyst contaminants before introduction into reactor 11.

Reactor 11 is maintained at a temperature of 280° to 300° F. and at pressure sufficient to maintain liquid phase conditions, generally 250 to 500 p.s.i. Heat of reaction is removed by coolant circulated through jackets 12 and 12a. 1940 pounds per day of cooled recycled solvent at a temperature of 250° F. are introduced into reactor 11 at a plurality of points. The residence time of the catalyst in reactor 11 is approximately 15 minutes. The linear velocity of liquid flow through reactor 11 is about 5 feet per second.

Effluent is withdrawn continuously from the outlet end of reactor 11 and passed directly to stirred reactor 22. This effluent comprises cyclohexane containing polyethylene dissolved therein, together with unreacted ethylene and inert gas and catalyst suspended in the effluent. The effluent withdrawn from reactor 11 contains approximately 3.7 weight percent polyethylene, 5.5 weight percent unreacted ethylene, and 0.01 weight percent of catalyst.

The temperature and pressure in reactors 22 and 25 are substantially the same as in reactor 11. The average residence time in reactors 22 and 25 is approximately 1 hour. The effluent withdrawn from reactor 25 contains approximately 7.3 weight percent polyethylene, and 1.9 weight percent unreacted ethylene. The effluent from reactor 25 is quenched with cooled recycle cyclohexane having a temperature of about 100° F. to precipitate polyethylene. The polymer slurry is passed to separator 32 for recovery of polyethylene as product and solvent for recycle.

During the entire process, 515 pounds of polymer are produced each day. This represents a polyethylene yield of approximately 860 pounds per pound of catalyst. When the process is conducted in conventional stirred reactor systems, about 500 pounds of polyethylene per pound of catalyst is produced. Thus, it is seen that the present invention in effect materially increases the polymer producing capacity of the catalyst.

While certain process steps, structures and example have been described for the purpose of illustration it is clear that the invention is not limited thereto. Thus, while a specific example has been described with respect to the production of polyethylene, similar results are obtainable when producing other olefin polymers, such as polypropylene, polybutene, copolymers of ethylene with propylene, butene and butadiene. The invention provides a process wherein a polymerizable hydrocarbon, for example, an olefin, is polymerized in the presence of a solid contact catalyst in dilute solution, first, in a small diameter, highly elongated tubular reaction zone, and the reaction effluent from the elongated zone is subjected to further reaction at polymerization conditions in an agitated zone in order to utilize more fully the catalytic activity of the suspended catalyst. Variations and modifications are possible within the scope of the foregoing disclosure and the claims to the invention as will be apparent to those skilled in the art.

I claim:

1. A process for obtaining high yields of normally solid polymer per unit weight of catalyst, which process comprises polymerizing an olefin in dilute phase in the presence of a catalyst and diluent under temperature and pressure conditions suitable for the production of normally solid polymer in a first reaction zone by passing the reaction mixture in streamline flow through an elongated tubular zone, recovering a crude reaction product mixture from said first zone containing up to about 10 weight percent polymer, diluent, unreacted olefin and catalyst, and passing said mixture to a second reaction zone comprising an agitated zone maintained under temperature and pressure conditions suitable for the production of a normally solid polymer from said olefin, forming such polymer in said zone, and recovering a polymeric product.

2. A process according to claim 1 wherein said olefin is an aliphatic 1-olefin having a maximum chain length of 8 carbon atoms and no branching nearer the double bond than the 4-position and said catalyst contains chromium oxide as an essential ingredient.

3. An improved process for the catalytic polymerization of olefins to form normally solid polymers which comprises introducing a reaction mixture comprising an olefin, an inert diluent and catalyst into an elongated tubular reaction zone, said reaction zone being surrounded by a fluid heat exchange medium to remove heat of reaction, passing said reaction mixture through said reaction zone in streamline flow under polymerization conditions of temperature, pressure and residence time suitable for the production of normally solid polymer in dilute phase, recovering a crude reaction product mixture from said elongated zone containing catalyst, diluent, unreacted olefin and up to about 10 weight percent solid polymer, passing said crude reaction mixture directly to an agitated reaction zone wherein further polymerization is effected, separating polymer product and diluent from said agitated zone effluent, and recovering said polymer as a product of the process.

4. A process according to claim 3 wherein said recovered diluent is cooled and then recycled to said tubular reaction zone to assist control of reaction temperature.

5. Process according to claim 3 wherein said tubular reaction zone comprises a plurality of upwardly extending pipe loops and said agitated zone is a series of stirred reactors.

6. A process according to claim 5 wherein said olefin is an aliphatic 1-olefin having a maximum chain length of 8 carbon atoms and no branching nearer the double bond than the 4-position and said catalyst contains chromium oxide as an essential ingredient.

7. An improved process for obtaining high yields of polyethylene per unit weight of catalyst which comprises polymerizing ethylene in a dilute liquid phase in a small diameter highly elongated tubular reaction zone to form polyethylene from a portion of said ethylene by passing said ethylene in streamline flow through said zone in the presence of a particulate catalyst at a temperature in the range of 150° to 450° F. and in the presence of a liquid hydrocarbon solvent, said reaction zone being surrounded by a fluid heat exchange medium to remove heat of reaction and maintain polymerization temperature within said zone, recovering a crude reaction product from the exit end of said tubular zone containing up to about 10 weight percent polyethylene, unreacted ethylene, and catalyst, passing said crude reaction mixture directly to an agitated tank-type reaction zone containing a plurality of tanks in series, said agitated zone being maintained at a temperature in the range of 150° to 450° F. and a pressure sufficient to maintain liquid phase, reacting unreacted ethylene in the presence of catalyst to form additional said polyethylene, recovering solvent and unreacted ethylene from the effluent of said agitated zone, and recovering said polyethylene from said agitated zone effluent as a product of the process.

8. Process according to claim 7 wherein said tubular reaction zone comprises a plurality of upwardly extending pipe loops and said agitated zone in a series of stirred reactors.

9. A process according to claim 7 wherein said recovered solvent is recycled to said tubular zone and is added at a plurality of points in said reaction zone at a temperature sufficiently below the temperature within said zone to absorb at least a part of the heat of reaction.

10. A process for obtaining high yields of normally solid polymer per unit weight of catalyst, which comprises polymerizing an olefin, which is polymerizable to a normally solid polymer, by contacting said olefin in streamline flow in a small diameter highly elongated reaction zone with a catalyst comprising chromium oxide, including a substantial portion of hexavalent chromium, associated with at least one additional oxide selected from the group consisting of silica, alumina, zirconia and thoria in the presence of a liquid hydrocarbon diluent under polymerization conditions, including a temperature in the range of 150° F. to 450° F., suitable for the polymerization of only a portion of said olefin to a normally solid polymer, said elongated zone being surrounded by a heat exchange fluid to remove the heat of reaction, passing the effluent containing up to about 10 weight percent polymer from said elongated zone directly to an agitated zone maintained under polymerization conditions to polymerize additional olefin in said effluent and form a polymer solution containing a substantial amount of polymer, said polymerization in said agitated zone being carried to substantial completion, separating polymer from the effluent from said agitated zone, and recycling recovered solvent to said elongated zone to absorb at least a part of the heat of reaction.

References Cited in the file of this patent

UNITED STATES PATENTS

| | | |
|---|---|---|
| 2,692,261 | Peters et al. | Oct. 19, 1954 |
| 2,825,721 | Hogan et al. | Mar. 4, 1958 |
| 2,856,395 | Richard et al. | Oct. 14, 1958 |
| 2,889,314 | Fritz | June 2, 1959 |